(12) United States Patent
Gunda et al.

(10) Patent No.: US 11,307,938 B1
(45) Date of Patent: Apr. 19, 2022

(54) SYSTEM AND METHOD FOR EFFICIENT GARBAGE COLLECTION BY GENERATING DEDUPLICATION POOLS IN A BACKUP STORAGE SYSTEM BASED ON APPLICATION TYPES

(71) Applicant: Dell Products L.P., Hopkinton, MA (US)

(72) Inventors: Kalyan Chakravarthy Gunda, Bangalore (IN); Gururaj Kulkarni, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/072,824

(22) Filed: Oct. 16, 2020

(51) Int. Cl.
*G06F 11/14* (2006.01)
*G06F 3/06* (2006.01)

(52) U.S. Cl.
CPC ........ *G06F 11/1453* (2013.01); *G06F 3/0604* (2013.01); *G06F 3/065* (2013.01); *G06F 3/0641* (2013.01); *G06F 3/0644* (2013.01); *G06F 3/0656* (2013.01); *G06F 3/0683* (2013.01); *G06F 11/1461* (2013.01)

(58) Field of Classification Search
CPC ............. G06F 11/1453; G06F 11/1461; G06F 3/0604; G06F 3/0644; G06F 3/065; G06F 3/0641; G06F 3/0656; G06F 3/0683

USPC .......................................................... 711/162
See application file for complete search history.

(56) References Cited

U.S. PATENT DOCUMENTS

| | | | | |
|---|---|---|---|---|
| 9,460,102 | B1 * | 10/2016 | Bono | G06F 3/0641 |
| 9,529,545 | B1 * | 12/2016 | Bono | G06F 3/0685 |
| 2020/0192589 | A1 * | 6/2020 | Mehta | G06K 9/6256 |
| 2020/0356292 | A1 * | 11/2020 | Ippatapu | G06F 11/3034 |
| 2021/0133168 | A1 * | 5/2021 | Nara | G06F 16/1748 |
| 2021/0216407 | A1 * | 7/2021 | Borate | G06F 11/1448 |

\* cited by examiner

*Primary Examiner* — Than Nguyen
(74) *Attorney, Agent, or Firm* — Chamberlain, Hrdlicka, White, Williams, & Aughtry

(57) ABSTRACT

A method for managing storage devices in a backup storage system includes obtaining, by a backup agent, a backup storage initiation request, identifying, in response to the backup storage initiation request, an initial grouping amount for a plurality of application types, generating a plurality of backup storage deduplication pools based on the initial grouping amount, generating a buffer pool, and generating a plurality of deduplication pool metadata mappings based on the plurality of backup storage deduplication pools, wherein a backup storage deduplication pool of the plurality of backup storage deduplication pools comprises a storage device, and wherein the buffer pool comprises a plurality of storage devices.

20 Claims, 8 Drawing Sheets

SYSTEM AND METHOD FOR EFFICIENT GARBAGE COLLECTION BY GENERATING DEDUPLICATION POOLS IN A BACKUP STORAGE SYSTEM BASED ON APPLICATION TYPES

BACKGROUND

Computing devices in a system may include any number of computing resources such as processors, memory, and persistent storage. The computing resources, specifically the persistent storage devices, may be maintained by cleaning policies implemented on storage device pools of storage devices.

SUMMARY

In general, in one aspect, the invention relates to a method for managing storage devices in a backup storage system. The method includes obtaining, by a backup agent, a backup storage initiation request, identifying, in response to the backup storage initiation request, an initial grouping amount for a plurality of application types, generating a plurality of backup storage deduplication pools based on the initial grouping amount, generating a buffer pool, and generating a plurality of deduplication pool metadata mappings based on the plurality of backup storage deduplication pools, wherein a backup storage deduplication pool of the plurality of backup storage deduplication pools comprises a storage device, and wherein the buffer pool comprises a plurality of storage devices.

In one aspect, the invention relates to a non-transitory computer readable medium that includes computer readable program code, which when executed by a computer processor enables the computer processor to perform a method for managing storage devices in a backup storage system. The method includes obtaining, by a backup agent, a backup storage initiation request, identifying, in response to the backup storage initiation request, an initial grouping amount for a plurality of application types, generating a plurality of backup storage deduplication pools based on the initial grouping amount, generating a buffer pool, and generating a plurality of deduplication pool metadata mappings based on the plurality of backup storage deduplication pools, wherein a backup storage deduplication pool of the plurality of backup storage deduplication pools comprises a storage device, and wherein the buffer pool comprises a plurality of storage devices.

In one aspect, the invention relates to a system that includes a processor and memory that includes instructions, which when executed by the processor, perform a method. The method includes obtaining, by a backup agent, a backup storage initiation request, identifying, in response to the backup storage initiation request, an initial grouping amount for a plurality of application types, generating a plurality of backup storage deduplication pools based on the initial grouping amount, generating a buffer pool, and generating a plurality of deduplication pool metadata mappings based on the plurality of backup storage deduplication pools, wherein a backup storage deduplication pool of the plurality of backup storage deduplication pools comprises a storage device, and wherein the buffer pool comprises a plurality of storage devices.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for managing a backup storage system. Specifically, embodiments of the invention include using one or more backup agents that initiate the generation of deduplication pools in the backup storage system that are based on application types identified in a set of production hosts. The application(s) may be backed up and stored in a deduplicated manner in the backup storage system. The backup agent may identify the deduplication pool in which the backups are to be stored and initiate deduplication against the rest of the data in the corresponding deduplication pool. In this manner, the data of each backup is deduplicated only against other backups in the same deduplication pool.

Embodiments of the invention further relate to a method for generating the deduplication pools prior to providing the service of the backup storage system to the production hosts. Alternatively, deduplication pools may be generated dynamically as the production hosts utilize the backup storage system to store the backups.

Figure 1A:
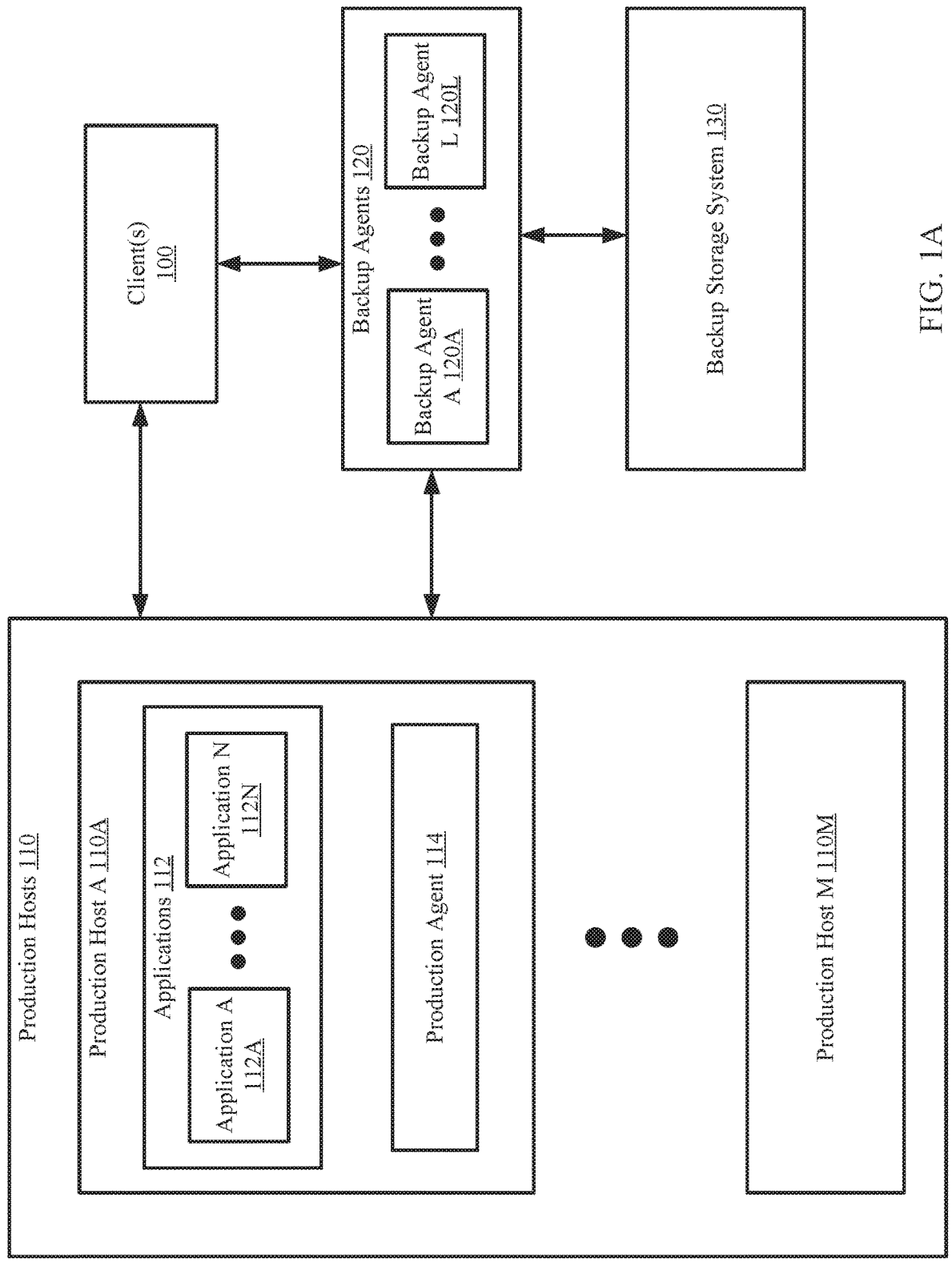
FIG. 1A shows a diagram of a system in accordance with one or more embodiments of the invention.

FIG. 1A shows an example system in accordance with one or more embodiments of the invention. The system includes clients (100), one or more backup agents (120), one or more production hosts (110) and a backup storage system (130). The system may include additional, fewer, and/or different components without departing from the invention. Each component may be operably connected to any of the other components via any combination of wired and/or wireless connections. Each component illustrated in FIG. 1A is discussed below.

In one or more embodiments of the invention, the backup agents (120) manage the protection of data generated by the production hosts (110). The backup agents (e.g., 120A, 120L) may manage the protection of data by implementing backup policies for applications (112) executing on the production hosts (110). The backup policies may specify how to back up the applications (112) and to store the backups in the backup storage system (130).

In one or more embodiments of the invention, the backup agents (120) further manage the protections of the data by managing the deduplication of backups prior to storage in the backup storage system (130).

As used herein, deduplication refers to methods of storing only portions of data objects (the portions of which also referred to as data portions) that are not already stored in persistent storage. For example, when multiple versions of a large data object, having only minimal differences between each of the versions, are stored without deduplication, storing each version will require approximately the same amount of storage space of a deduplication pool. In contrast, when the multiple versions of the large data object (e.g., a file, a backup of a database, a backup of a virtual machine, etc.) are stored with deduplication, only the first version of the multiple versions stored will require a substantial amount of storage. Once the first version is stored in the deduplication pool, the subsequent versions of the large data object subsequently stored will be de-duplicated before being stored in the persistent storage resulting in much less storage space of the persistent storage being required to store the subsequently stored versions when compared to the amount of storage space of the deduplication pool required to store the first stored version.

Figure 4:
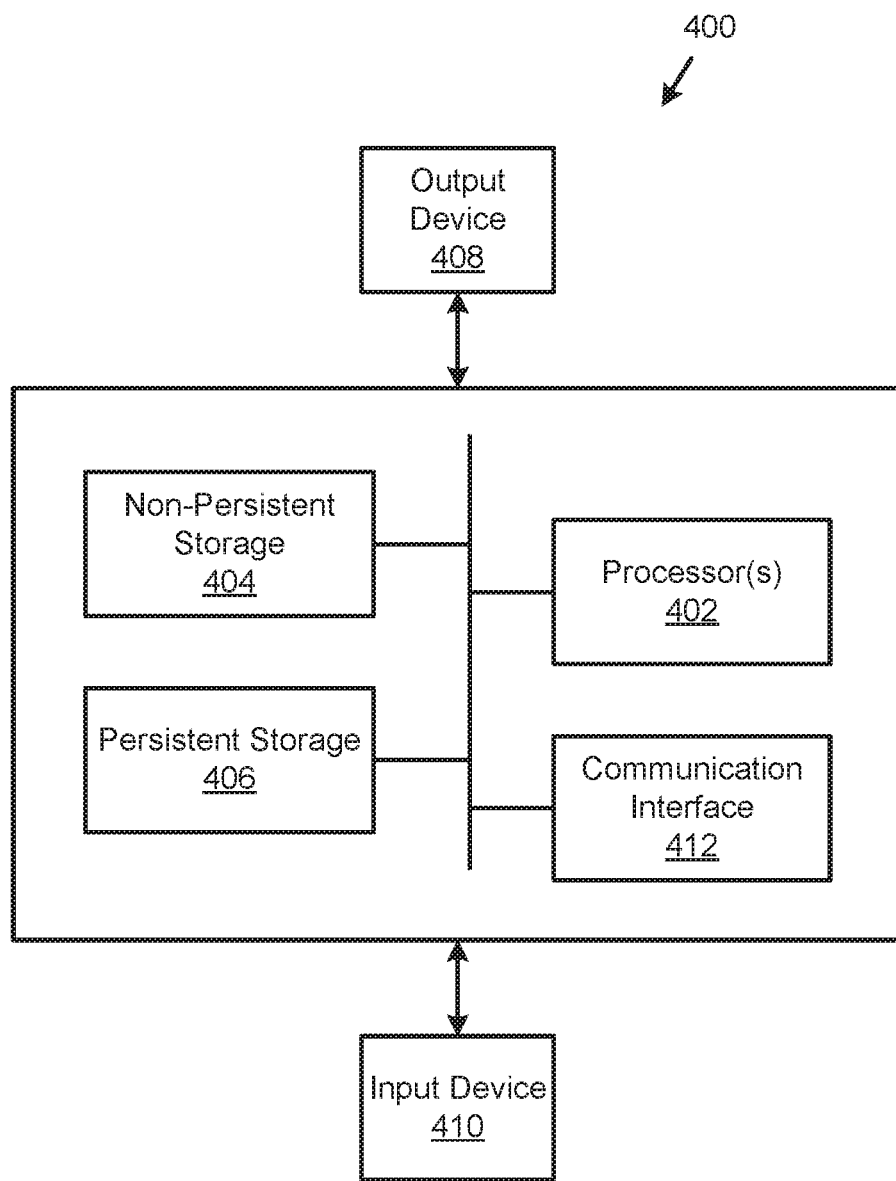
FIG. 4 shows a diagram of a computing device in accordance with one or more embodiments of the invention.

In one or more embodiments of the invention, each backup agent (120A, 120L) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the backup agent (120A, 120L) described throughout this application and/or all, or a portion thereof, of the methods illustrated in FIGS. 2A-2B.

In one or more embodiments of the invention, the backup agent (120A, 120L) is implemented as a logical device. The logical device may utilize the computing resources of any number of computing devices and thereby provide the functionality of the backup agent (120A, 120L) described throughout this application and/or all, or a portion thereof, of the methods illustrated in FIGS. 2A-2B. For additional details regarding the backup agents (120A, 120L), see, e.g., FIG. 1C.

In one or more embodiments of the invention, the client(s) (100) utilize services provided by the production hosts (110) and/or the backup agents (120). Specifically, the client(s) (100) may utilize the applications (112) to obtain, modify, and/or store data. The data may be generated from the applications (112). Further, the client(s) (100) may utilize the backup agents (120) to initiate backups of the applications (e.g., 112). The client(s) may trigger a backup operation performed by the backup agent(s) (120) by sending a backup request to the backup agent (120) that specifies one or more applications.

In one or more embodiments of the invention, a client (100) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the client (100) described throughout this application.

In one or more embodiments of the invention, the client(s) (100) are implemented as a logical device. The logical device may utilize the computing resources of any number of computing devices and thereby provide the functionality of the client(s) (100) described throughout this application.

In one or more embodiments of the invention, the production hosts (110) host applications (112). The applications (112) may be logical entities executed using computing resources (not shown) of the production host (110A, 110M). Each of the applications (112A, 112N) may be performing similar or different processes. In one or more embodiments of the invention, the applications (112) provide services to users, e.g., clients (100). For example, the applications (112) may be categorized based on application types. Examples of application types include, but are not limited to, a database type that is associated with instances of databases, an email server type that is associated with email servers, an email module type that is associated with email modules, a virtual machine type that is associated with virtual machines, a hypervisor type that is associated with hypervisors, and a network management type that is associated with network management systems.

In one or more embodiments of the invention, each application may be identified using an application type identifier. The application type identifier may be a string of numbers, letters, symbols, or any combination thereof that uniquely identifies each application. The application type identifier may be generated by a client (e.g., 150) operated by a user.

In one or more embodiments of the invention, the production host (110A, 110M) includes a production agent (114). The production agent may include functionality for generating backups of one or more applications (142A, 142N), storing the backups in the backup storage system (130), and/or obtaining the backups from the backup storage system (130) when restoring the applications (112A, 112N).

In one or more embodiments of the invention, the production agent(s) (114) may each perform backups of applications in backup sessions. In one or more embodiments of the invention, a backup session is an operation performed by a production agent that includes backing up a predetermined number of applications during the same period of time. The number of applications that may be backed up in a backup session may be determined by, for example, a hypervisor (not shown), a client (e.g., 100), and/or any other entity without departing from the invention. The number of applications backed up in a backup session may be based on the computing resources available to the production agent performing the backup session.

In one or more embodiments of the invention, the production agent (114) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the production agent (114) described throughout this application.

In one or more of embodiments of the invention, the production agent (114) is implemented as computer instructions, e.g., computer code, stored on a persistent storage that when executed by a processor of the production host (110A, 110M) causes the production host (110A, 110M) to provide the functionality of the production agent (114) described throughout this application.

In one or more of embodiments of the invention, the applications (112) are implemented as computer instructions, e.g., computer code, stored on a persistent storage (e.g., on a production host (110A)) that when executed by a processor(s) of the production host (110A) cause the production host (110A) to provide the functionality of the applications (112) described throughout this application.

In one or more embodiments of the invention, each of the production hosts (110A, 110N) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production host (110A, 110M) described throughout this application.

In one or more embodiments of the invention, each of the production hosts (110A, 110M) is implemented as a logical device. The logical device may utilize the computing resources of any number of computing devices and thereby provide the functionality of the production host (110A, 110M) described throughout this application.

In one or more embodiments of the invention, the backup storage system (130) store backups of the applications (112). The backup storage system (130) may communicate with the backup agents (e.g., 120A, 120L) when obtaining backups to be stored and/or when transferring backups to the production hosts (110) when restoring applications. In one or more embodiments of the invention, a backup is a copy of data associated with an application. A backup may further include additional data that enables a production agent to restore an application associated with the backup from any production host.

In one or more embodiments of the invention, the backup storage system (130) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device cause the computing device to perform the functionality of the backup storage system (130) described throughout this application.

In one or more embodiments of the invention, the backup storage system (130) is implemented as a logical device. The logical device may utilize the computing resources of any number of computing devices and thereby provide the functionality of the backup storage described throughout this application. For additional details regarding the backup storage system (130), see, e.g., FIG. 1B.

Figure 1B:
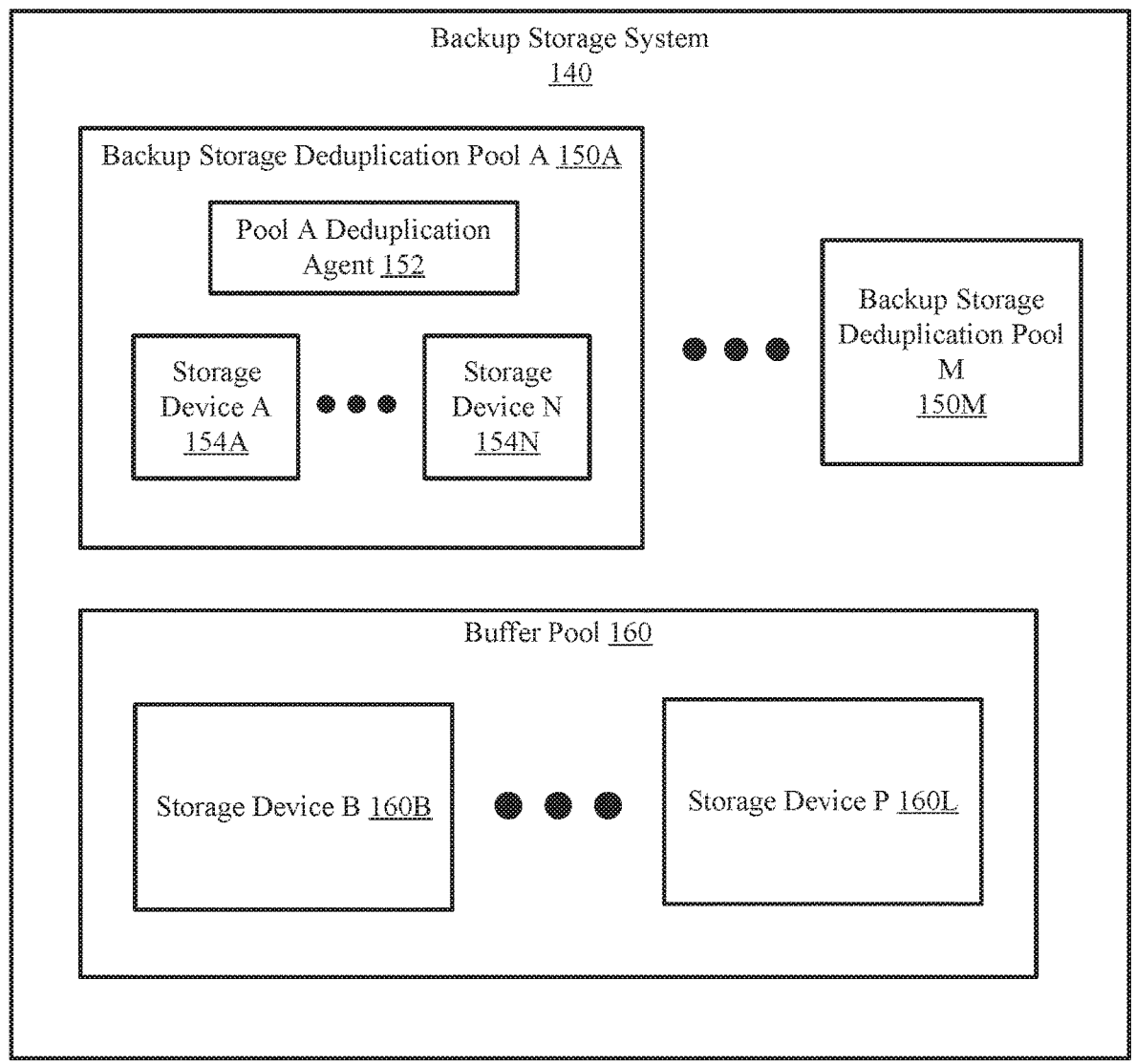
FIG. 1B shows a diagram of a backup storage system in accordance with one or more embodiments of the invention.

FIG. 1B shows a diagram of a backup storage system in accordance with one or more embodiments of the invention. The backup storage system (140) may be an embodiment of the backup storage system (130, FIG. 1A) discussed above. As discussed above, the backup storage system (140) stores backups of applications and performs deduplication operations on the backups based on the application types. To perform the aforementioned functionality, the backup storage system (140) may include one or more backup storage deduplication pools (150A, 150M) (also referred to simply as "deduplication pools") and a buffer pool (160). The backup storage system (140) may include additional, fewer, and/or different components without departing from the invention. Each of the aforementioned components of the backup storage system (140) illustrated in FIG. 1B is discussed below.

In one or more embodiments of the invention, each backup storage deduplication pool (150A, 150M) includes a logical grouping of one or more storage devices (e.g., 154A, 154N) and a pool deduplication agent (152). The grouping may be determined by a backup agent (or other entity) in accordance with FIGS. 2A-2B. Each backup storage deduplication pool (150A, 150M) may further include a pool deduplication agent (152) that manages the deduplication of data within each respective backup storage deduplication pool (150A, 150M).

In one or more embodiments of the invention, the buffer pool (160) is a secondary grouping of storage devices (160B, 160L). Any of the storage devices (160B, 160L) in the buffer pool (160) may be transferred (or otherwise assigned) to a backup storage deduplication pool (150A, 150M) in accordance with the methods of FIGS. 2A-2B.

In one or more embodiments of the invention, each deduplication pool is further equipped for performing data cleaning (also referred to as garbage collection). In one or more embodiments of the invention, "cleaning" or "garbage collection" refers to the process of deleting (or otherwise removing) all or a portion of data stored in a deduplication pool based on cleaning policies. The cleaning policies may specify, for example, a schedule for deleting aged data (e.g., data that has been stored in the storage device for longer than a predetermined period of time and/or data that has been deleted in the production hosts (110, FIG. 1A)). The cleaning policies may be managed by the pool deduplication agent (e.g., 152). Alternatively, the cleaning policies may be managed by a backup agent (see, e.g, FIG. 1C). The cleaning policies may further specify at what point in time to delete data in the backup storage system after the data has been deleted in the production hosts (e.g., immediately after deletion in the production host or after a predetermined period of time since the deletion in the production host).

Figure 1C:
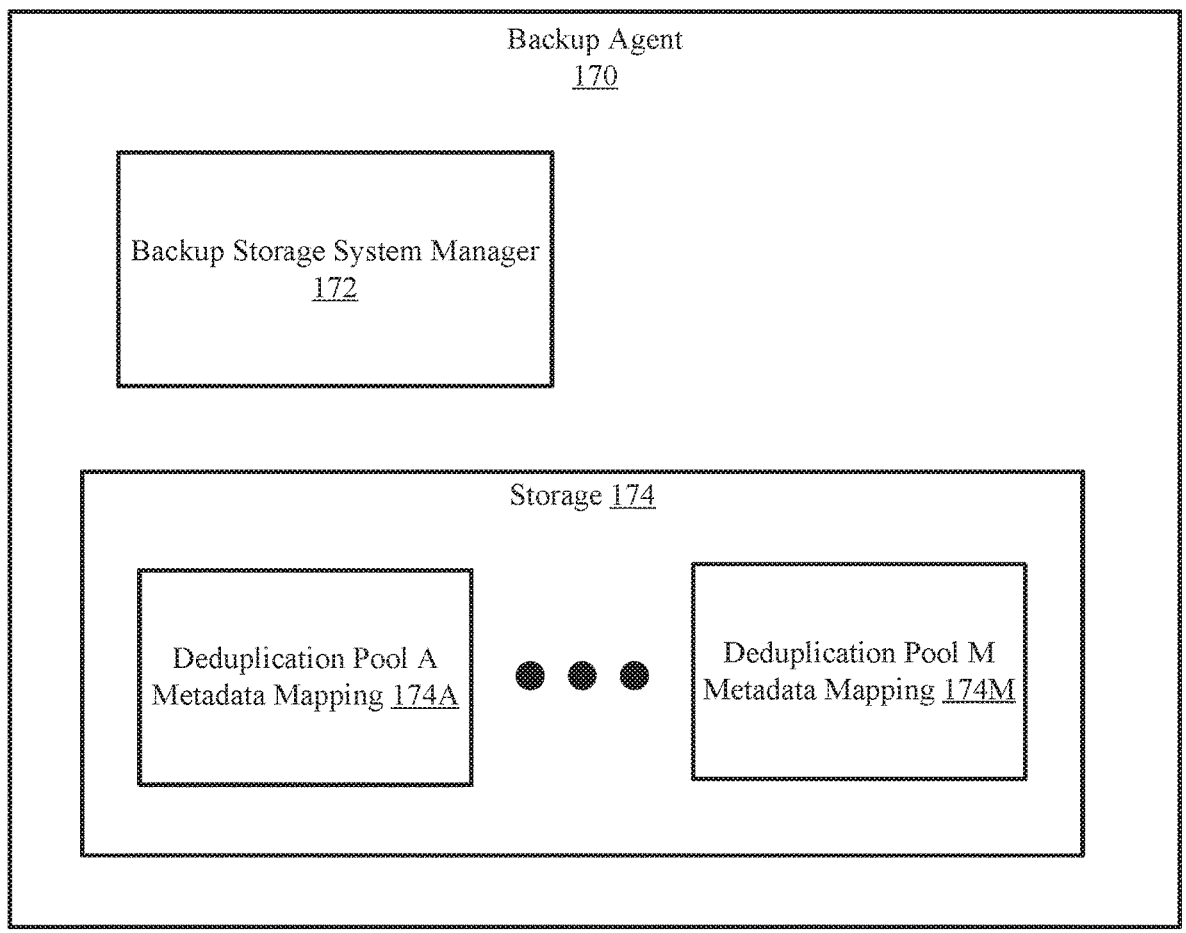
FIG. 1C shows a diagram of a backup agent in accordance with one or more embodiments of the invention.

FIG. 1C shows a diagram of a backup agent (170). The backup agent (170) may be an embodiment of a backup agent (120A, 120L) discussed above. As discussed above, the backup agent (170) may obtain backups of applications to be stored in a backup storage system. To perform the aforementioned functionality, the backup agent (170) may include a backup storage system manager (172) and storage (174). The backup agent (170) may include additional, fewer, and/or different components without departing from the invention. Each of the aforementioned components of the backup storage system (140) illustrated in FIG. 1B is discussed below.

In one or more embodiments of the invention, the backup storage system manager (172) includes functionality for obtaining backups from a production host, determining which backup storage deduplication pool (discussed in FIG. 1B) the backup is to be sent, and sending the backups to the corresponding backup storage deduplication pool. Further, the backup storage system manager (172) includes functionality for initiating the generation of the deduplication pools in accordance with the In one or more embodiments of the invention, the backup storage system manager (172) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the backup storage system manager (172) described throughout this application.

Figure 2A:
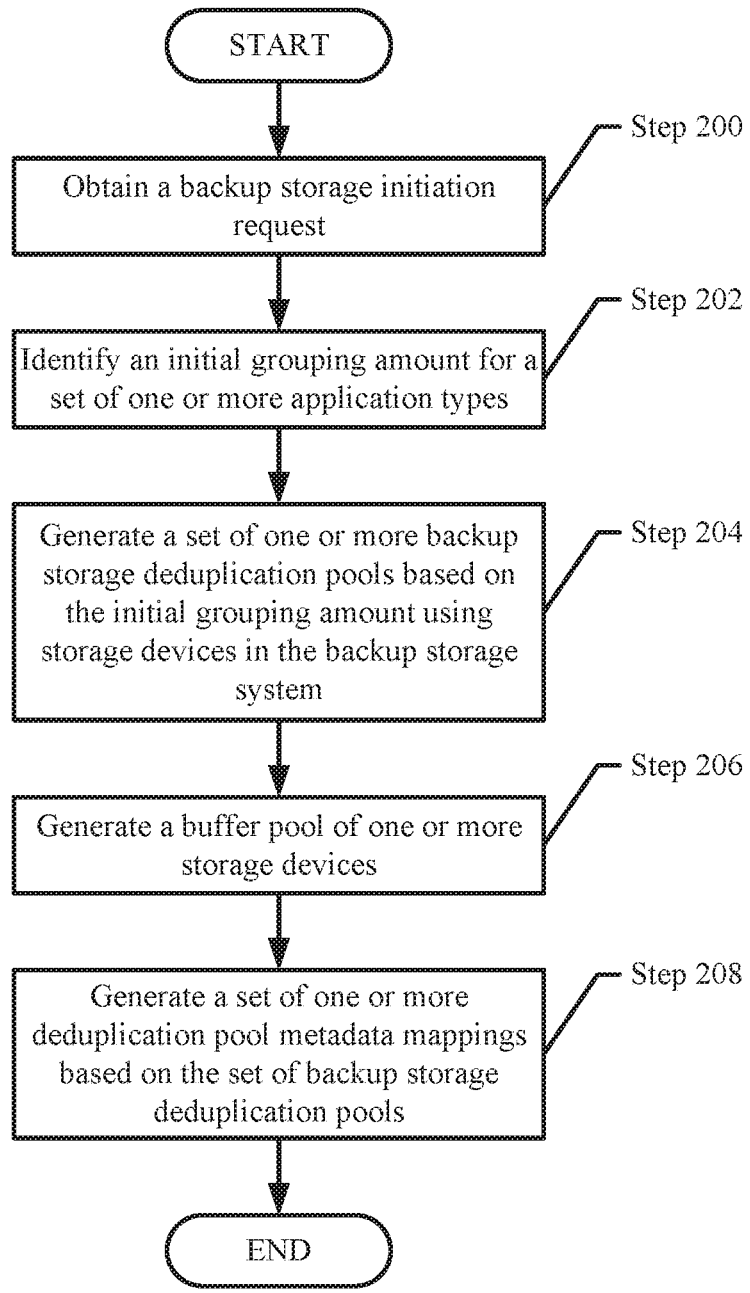
FIG. 2A shows a flowchart for a method for initiating generation of a set of backup storage deduplication pools in accordance with one or more embodiments of the invention.
Figure 2B:
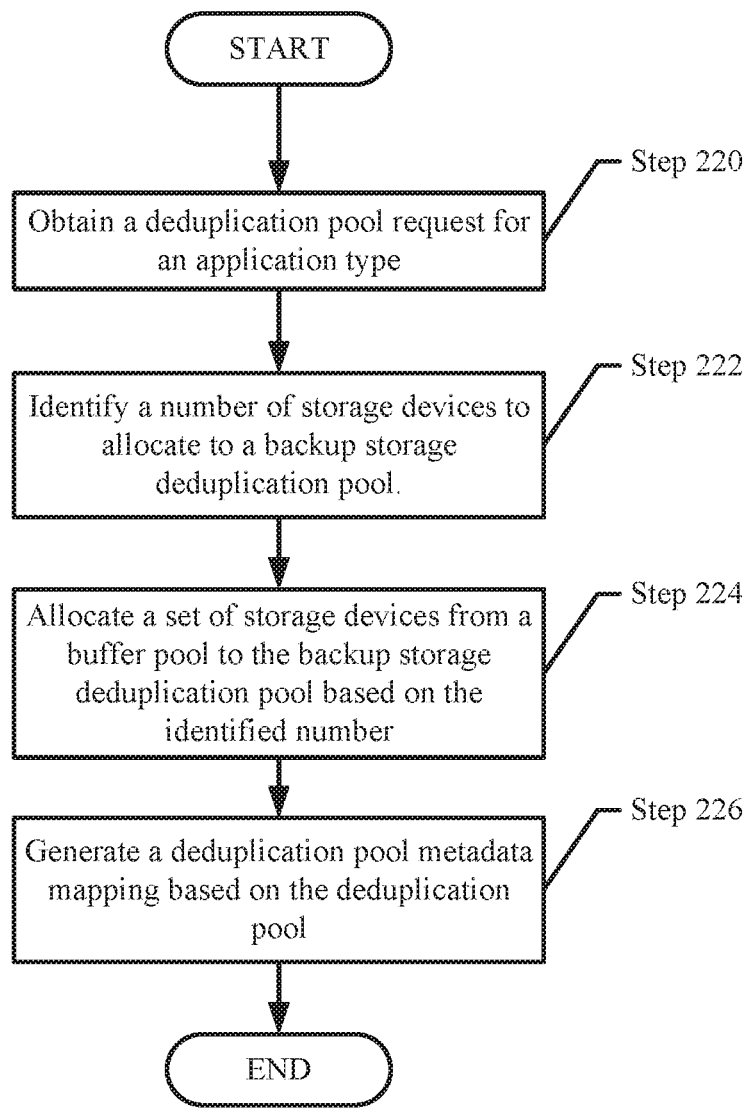
FIG. 2B shows a flowchart for initiating generation of a new backup storage deduplication pool in accordance with one or more embodiments of the invention.

In one or more of embodiments of the invention, the backup storage system manager (172) is implemented as computer instructions, e.g., computer code, stored on a persistent storage that when executed by a processor of the backup agent (170) cause the backup agent (170) to provide the functionality of the backup storage system manager (172) described throughout this application and/or all, or a portion thereof, of the method illustrated in FIGS. 2A-2B.

In one or more embodiments of the invention, the storage (174) stores deduplication pool metadata mappings (174A, 174M). The deduplication pool metadata mappings (174A, 174M) are data structures that each specify the data that is stored and deduplicated in a corresponding deduplication pool. The deduplication pool metadata mappings (174A, 174M) may be specify the data at a data object level or in a data portion level. In one or more embodiments of the invention, the deduplication pool metadata mappings (174A, 174M) may each specify the data objects and/or the data portions and a unique identifier of the data objects and/or data portions. The each of the unique identifiers may be, for example, a hash value of the data object and/or the data portion.

While not illustrated in FIG. 1C, the backup agent (170) may further manage cleaning policies. The cleaning policies, as discussed above, specify a schedule for cleaning data in the backup storage system after the data has been stored for a predetermined period of time. The cleaning policies may specify which data objects are maintained in the backup storage system and the application type of each respective data object. The backup storage system manager (172) may utilize the cleaning policies to identify which data is to be cleaned and which deduplication pool such data is stored in. After initiating a cleaning of the data, the corresponding metadata entries stored in the respective deduplication pool metadata mappings (174A, 174M).

FIGS. 2A-2B show flowcharts in accordance with one or more embodiments of the invention. While the various steps in the flowchart are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2A-2B may be performed in parallel with any other steps shown in FIGS. 2A-2B without departing from the scope of the invention.

FIG. 2A shows a flowchart for a method for initiating generation of a set of backup storage deduplication pools in accordance with one or more embodiments of the invention. The method shown in FIG. 2A may be performed by, for example, a backup agent (170, FIG. 1C). Other components of the system illustrated in FIG. 1A or FIG. 1C may perform the method of FIG. 2A without departing from the invention.

Turning to FIG. 2A, in step 200, a backup storage initiation request is obtained. In one or more embodiments of the invention, the backup storage initiation request specifies initiating a setup of a backup storage system. The setup may include initiating generation of one or more backup storage deduplication pools.

In one or more embodiments of the invention, the backup storage initiation request specifies a number of application types to be implemented by a set of production hosts and to be backed up by the backup storage system. In such embodiments in which the number of application types are not provided in the backup storage initiation request, the backup agent may determine the number of application types by sending requests to the production hosts to identify the application types implemented by the production hosts for data to be backed up in the backup storage system.

In step 202, an initial grouping amount for a set of one or more application types is identified. In one or more embodiments of the invention, the initial grouping amount is a number of storage devices to be allocated to each application type. The initial grouping amount is identified for an application type based on the amount of data produced by the production hosts for such application type. The initial grouping amounts may be further based on a number of available storage devices in the backup storage system.

Further, the initial grouping amount of data for a first application type may be compared to data of a second application type to identify, or otherwise determine, the initial grouping amount to be applied to a deduplication pool of the first application type. For example, if a production host produces a large amount of data of a first application type compared to data of a second application type, the initial grouping amount of the first application type may be larger than the initial grouping amount of the second application type.

In step 204, a set of one or more backup storage deduplication pools is generated based on the initial grouping amount using storage devices in the backup storage system. In one or more embodiments of the invention, the backup storage deduplication pools are generated by allocating a number of storage devices to each deduplication pool. Further, generating the backup storage deduplication pools includes installing a pool deduplication agent for each backup storage deduplication pool. The pool deduplication agents are installed such that they are operatively connected to each storage device of the corresponding backup storage deduplication pools.

In step 206, a buffer pool of one or more storage devices is generated. In one or more embodiments of the invention, the buffer pool is generated by allocating a number of remaining storage devices to the buffer pool.

In step 208, a set of one or more deduplication pool metadata mappings is generated based on the set of backup storage deduplication pools. In one or more embodiments of the invention, the deduplication pool metadata mappings specify the data stored in the respective deduplication pools. The data may be specified in any level of granularity. For example, the data may be specified at a data object level or at a data block level (e.g., a portion of a data object). As discussed above, the data specified in a deduplication pool metadata mapping may be used to determine which data is already stored in the corresponding backup storage deduplication pool.

FIG. 2B shows a flowchart for a method for initiating generation of a set of backup storage deduplication pools in accordance with one or more embodiments of the invention. The method shown in FIG. 2B may be performed by, for example, a backup agent (170, FIG. 1C). Other components of the system illustrated in FIG. 1A or FIG. 1C may perform the method of FIG. 2B without departing from the invention.

Turning to FIG. 2A, in step 220, a deduplication pool request is obtained for an application type. In one or more embodiments of the invention, the deduplication pool request specifies introducing a new deduplication pool for a new application type that is not already maintained by any deduplication pools in the backup storage system.

In step 222, a number of storage devices to allocate to a backup storage deduplication pool is identified. In one or more embodiments of the invention, the number of available storage devices are identified by determining the amount of data produced by the production hosts for the new application type and the amount of such data determined to be backed up in the backup storage system. The amount of data for such application type is compared to the data produced by the production hosts for other application types, if any, being backed up in the backup storage system. The number is identified based on the amount of data produced for the new application type relative to the other application types. For example, if the data produced for the new application type is similar to data produced for a second application type, the identified number for the new application type may be similar to a number of storage devices currently provided to the backup storage deduplication pool of the second application type.

In step 224, a set of storage devices is allocated from a buffer pool to the backup storage deduplication pool based on the identified number.

In step 226, a deduplication pool metadata mapping is generated based on the backup storage deduplication pool. In one or more embodiments of the invention, similar to step 208 of FIG. 2A, the deduplication pool metadata mapping of the new deduplication pool specifies the data stored in the new backup storage deduplication pool. The data may be specified in any level of granularity. For example, the data may be specified at a data object level or at a data block level (e.g., a portion of a data object).

Example

Figure 3A:
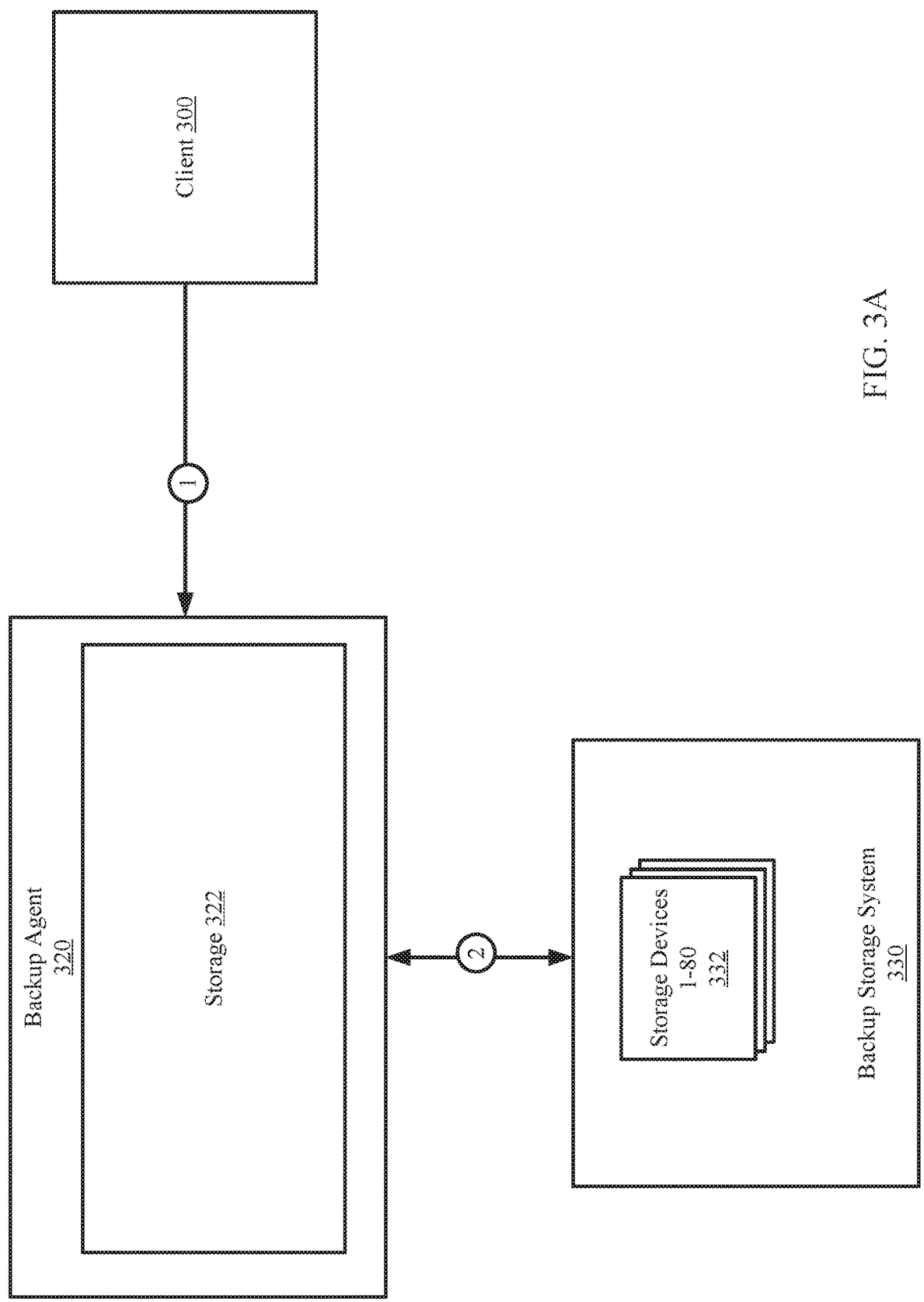
FIGS. 3A-3B show an example in accordance with one or more embodiments of the invention.
Figure 3B:
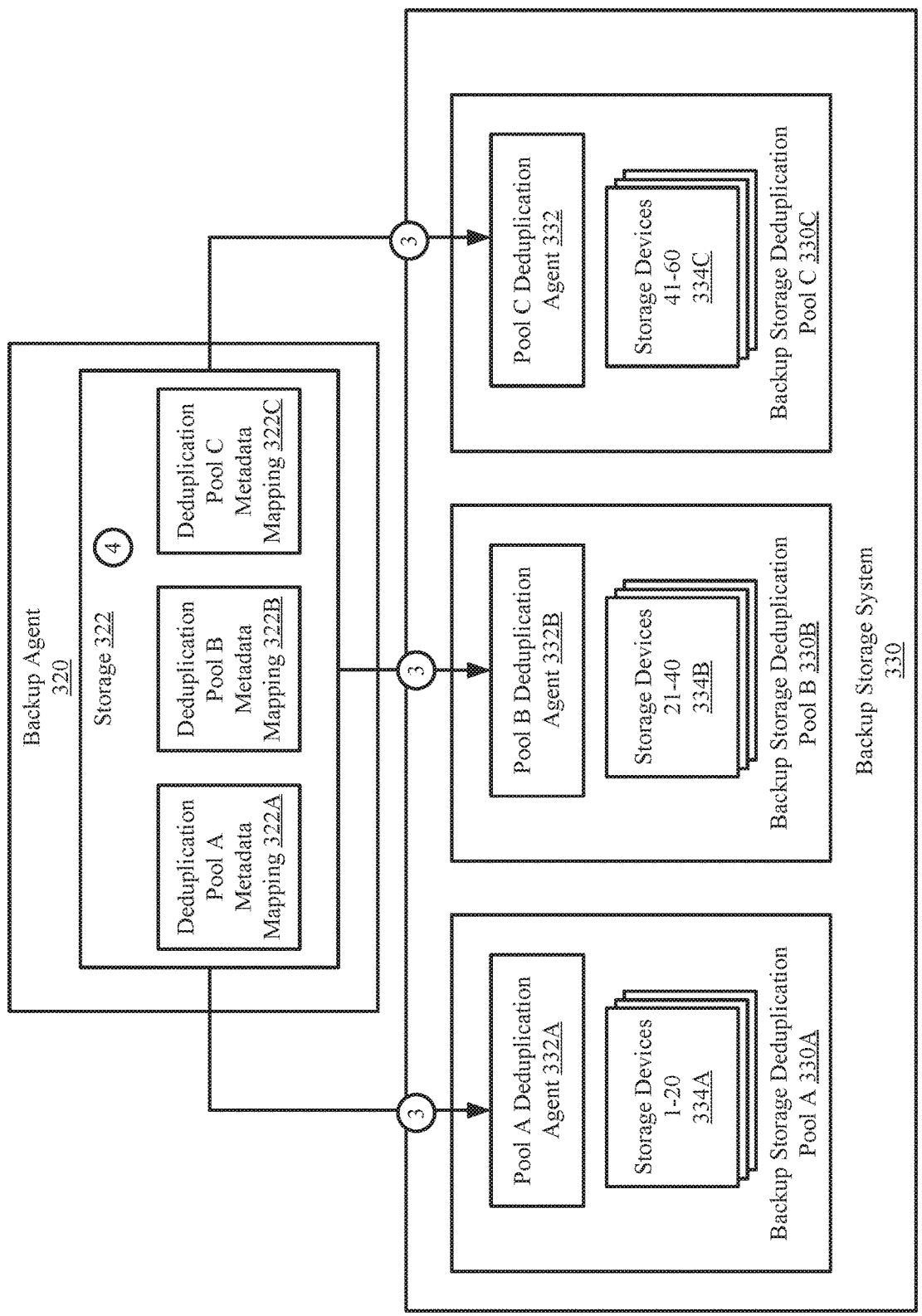

The following section describes an example. The example, illustrated in FIGS. 3A-3B, is not intended to limit the invention. Turning to the example, FIG. 3A shows a diagram of an example system. The example system includes a client (300), a backup agent (320), and a backup storage system (330). For the sake of brevity, not all components of the example system are illustrated in FIG. 3A.

Turning to FIG. 3A, the client (300), which may be an administrative client, desires to set up a backup storage system (330) to utilize the backup storage system (330) to deduplicate independently from three application types of data in a production host (not shown). Three application types are databases, virtual machines, and email modules, respectively. The client (300) sends a backup storage initiation request to the backup agent (320) [1]. The backup storage initiation request specifies preparing the backup storage system (330) to include three deduplication pools, one for each application type.

The backup agent (320), in response to the backup initiation request, performs the method of FIG. 2A and identifies an initial grouping amount for each application type. Said another way, the backup agent (310) identifies a number of storage devices to assign to each backup storage deduplication pool based on a number of storage devices (332) in the backup storage system (330) available to be assigned [2]. The backup storage system (330) includes 80 storage devices (332) that are all available to be assigned to a deduplication pool and/or to a buffer pool.

Continuing the example from FIG. 3A, FIG. 3B shows a second diagram of the example system. For the sake of brevity, not all components of the example system are illustrated in FIG. 3B. At a point in time later, the backup agent (320) initiates the generation of the backup storage deduplication pools (330A, 330B, 330C) [3]. Specifically, the backup agent installs a pool deduplication agent (332A, 332B, 332C) in each backup storage deduplication pool (330A, 330B, 330C), which performs the storage of data associated with the corresponding application type. Further, storage devices 1-20 (334A) are assigned to backup storage deduplication pool A (330A), storage devices 21-40 (334B) are assigned to backup storage deduplication pool B (334B), and storage devices 41-60 are assigned to backup storage deduplication pool C (330C). While not illustrated in FIG. 3B, a buffer pool is generated that includes storage devices 61-80. As data gets stored in the three backup storage deduplication pools (330A, 330B, 330C) and as a deduplication pool runs out of storage, any of the storage devices in the buffer pool may be assigned to any backup storage deduplication pool that needs additional storage, as determined by the backup agent (320).

The data stored of databases is deduplicated and stored in backup storage deduplication pool A (330A), the data of virtual machines (including data stored therein) is deduplicated and stored in backup storage deduplication pool B (330B), and the data of email modules (including the data stored therein) is deduplicated and stored in backup storage deduplication pool C (330C).

In addition to initiating the generation of the backup storage deduplication pools (330A, 330B, 330C), the backup agent (320) generates deduplication pool metadata mappings (322A, 322B, 322C) that are stored in storage [4]. Each deduplication pool metadata mapping (322A, 322B, 322C) specifies which portions of data are stored in the corresponding deduplication pool. The deduplication pool metadata mappings (322A, 322B, 322C) may be used for deduplication of data associated with the respective application type. For example, deduplication pool A metadata mapping (322A) may be used to perform deduplication operations for database type data stored in the backup storage system (330).

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

Embodiments of the invention may improve the efficiency of managing storage devices. Specifically, embodiments of the invention may be used to improve the deduplication operations performed on a large amount of data by dividing the deduplication operations of the data based on a type of application associated with the data.

Further, embodiments of the invention enable backup agents to manage the garbage collection of a heterogeneous set of data objects of varying application types stored in the backup storage system. The backup agents may be equipped to track the application types of each data object by obtaining corresponding application type identifiers. The application type identifiers may be used to determine which deduplication pool is storing the data at that point in time, and sending deletion requests for the data.

By performing garbage collection for data based on application types, embodiments of the invention reduce the likelihood and quantity of data fragmentation. That is, data of the same application type may be stored contiguously in the storage devices. Further, as data gets deleted in the production host at an application level, the backup agents are more equipped to remove the data in the backup storage system and quickly make space for additional data to be stored. In this manner, the storage and deletion of data is improved for a large set of data of various applications.

Thus, embodiments of the invention may address the problem of inefficient use of computing resources. This problem arises due to the technological nature of the environment in which storage systems are utilized.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing storage devices in a backup storage system, the method comprising:
    obtaining, by a backup agent, a backup storage initiation request;
    identifying, in response to the backup storage initiation request, an initial grouping amount for a plurality of application types;
    generating a plurality of backup storage deduplication pools based on the initial grouping amount;
    generating a buffer pool; and
    generating a plurality of deduplication pool metadata mappings based on the plurality of backup storage deduplication pools,
    wherein a backup storage deduplication pool of the plurality of backup storage deduplication pools comprises a storage device, and
    wherein the buffer pool comprises a plurality of storage devices.

2. The method of claim 1, further comprising:
    obtaining a deduplication pool request for an application type, wherein the application type is not one of the plurality of application types;
    identifying a number of storage devices to allocate to a backup storage deduplication pool associated with the application type;
    allocating a second plurality of storage devices from the buffer pool, wherein at least a portion of the plurality of storage devices comprises the second plurality of storage devices; and
    generating a deduplication pool metadata mapping based on the backup storage deduplication pool.

3. The method of claim 1, wherein an application type of the plurality of application types comprises at least one of: a database type, an email module type, a virtual machine type, a hypervisor type, and a network management type.

4. The method of claim 1, wherein generating the plurality of backup storage deduplication pools comprises:
    assigning the storage device to the backup storage deduplication pool; and
    installing a pool deduplication agent in the backup storage deduplication pool,
    wherein the pool deduplication agent is operatively connected to the storage device.

5. The method of claim 1,
    wherein a first deduplication pool metadata mapping of the plurality of deduplication pool metadata mappings specifies data associated with a first application type of the plurality of application types, and wherein a second deduplication pool metadata mapping of the plurality of deduplication pool metadata mappings specifies second data associated with a second application type of the plurality of application types.

6. The method of claim 1, further comprising:
obtaining a backup of data from a production host;
identifying an application type associated with the data in the backup of data from the production host;
performing a deduplication operation on the backup of the data to obtain deduplicated data; and
initiating storage of the deduplicated data in the backup storage system.

7. The method of claim 6, wherein initiating the storage of the deduplicated data in the backup storage system comprises storing the deduplicated data in the storage device, wherein the backup storage deduplication pool is associated with the application type.

8. A non-transitory computer readable medium comprising computer readable program code, which when executed by a computer processor enables the computer processor to perform a method for managing storage devices in a backup storage system, the method comprising:
obtaining, by a backup agent, a backup storage initiation request;
identifying, in response to the backup storage system initiation request, an initial grouping amount for a plurality of application types;
generating a plurality of backup storage deduplication pools based on the initial grouping amount;
generating a buffer pool; and
generating a plurality of deduplication pool metadata mappings based on the plurality of backup storage deduplication pools,
wherein a backup storage deduplication pool of the plurality of backup storage deduplication pools comprises a storage device, and
wherein the buffer pool comprises a plurality of storage devices.

9. The non-transitory computer readable medium of claim 8, the method further comprising:
obtaining a deduplication pool request for an application type, wherein the application type is not one of the plurality of application types;
identifying a number of storage devices to allocate to a backup storage deduplication pool associated with the application type;
allocating a second plurality of storage devices from the buffer pool, wherein at least a portion of the plurality of storage devices comprises the second plurality of storage devices; and
generating a deduplication pool metadata mapping based on the backup storage deduplication pool.

10. The non-transitory computer readable medium of claim 8, wherein an application type of the plurality of application types comprises at least one of: a database type, an email module type, a virtual machine type, a hypervisor type, and a network management type.

11. The non-transitory computer readable medium of claim 8, wherein generating the plurality of backup storage deduplication pools comprises:
assigning the storage device to the backup storage deduplication pool; and
installing a pool deduplication agent in the backup storage deduplication pool,
wherein the pool deduplication agent is operatively connected to the storage device.

12. The non-transitory computer readable medium of claim 8,
wherein a first deduplication pool metadata mapping of the plurality of deduplication pool metadata mappings specifies data associated with a first application type of the plurality of application types, and
wherein a second deduplication pool metadata mapping of the plurality of deduplication pool metadata mappings specifies second data associated with a second application type of the plurality of application types.

13. The non-transitory computer readable medium of claim 8, the method further comprising:
obtaining a backup of data from a production host;
identifying an application type associated with the data in the backup of data from the production host;
performing a deduplication operation on the backup of the data to obtain deduplicated data; and
initiating storage of the deduplicated data in the backup storage system.

14. The non-transitory computer readable medium of claim 13, wherein initiating the storage of the deduplicated data in the backup storage system comprises storing the deduplicated data in the storage device, wherein the backup storage deduplication pool is associated with the application type.

15. A system, comprising:
a processor; and
memory comprising instructions which, when executed by the processor, perform a method, the method comprising:
obtaining a backup storage initiation request;
identifying, in response to the backup storage initiation request, an initial grouping amount for a plurality of application types;
generating a plurality of backup storage deduplication pools based on the initial grouping amount;
generating a buffer pool; and
generating a plurality of deduplication pool metadata mappings based on the plurality of backup storage deduplication pools,
wherein a backup storage deduplication pool of the plurality of backup storage deduplication pools comprises a storage device, and
wherein the buffer pool comprises a plurality of storage devices.

16. The system of claim 15, the method further comprising:
obtaining a deduplication pool request for an application type, wherein the application type is not one of the plurality of application types;
identifying a number of storage devices to allocate to a backup storage deduplication pool associated with the application type;
allocating a second plurality of storage devices from the buffer pool, wherein at least a portion of the plurality of storage devices comprises the second plurality of storage devices; and
generating a deduplication pool metadata mapping based on the backup storage deduplication pool.

17. The system of claim 15, wherein an application type of the plurality of application types comprises at least one of: a database type, an email module type, a virtual machine type, a hypervisor type, and a network management type.

18. The system of claim 15, wherein generating the plurality of backup storage deduplication pools comprises:
assigning the storage device to the backup storage deduplication pool; and installing a pool deduplication agent in the backup storage deduplication pool,
wherein the pool deduplication agent is operatively connected to the storage device.

19. The system of claim 15,
wherein a first deduplication pool metadata mapping of the plurality of deduplication pool metadata mappings specifies data associated with a first application type of the plurality of application types, and
wherein a second deduplication pool metadata mapping of the plurality of deduplication pool metadata mappings specifies second data associated with a second application type of the plurality of application types.

20. The system of claim 15, the method further comprising:
obtaining a backup of data from a production host;
identifying an application type associated with the data in the backup of data from the production host;
performing a deduplication operation on the backup of the data to obtain deduplicated data; and
initiating storage of the deduplicated data in the backup storage system,
wherein initiating the storage of the deduplicated data in the backup storage system comprises storing the deduplicated data in the storage device, wherein the backup storage deduplication pool is associated with the application type.

* * * * *